May 27, 1930.  W. D. STALEY  1,760,090

DRY CELL

Filed July 6, 1928

INVENTOR
Wayne D. Staley
BY
Pennie, Davis, Marvin & Edmonds
ATTORNEYS

Patented May 27, 1930

1,760,090

UNITED STATES PATENT OFFICE

WAYNE D. STALEY, OF MADISON, WISCONSIN, ASSIGNOR TO BURGESS BATTERY COMPANY, OF MADISON, WISCONSIN, A CORPORATION OF WISCONSIN

DRY CELL

Application filed July 6, 1928. Serial No. 290,761.

This invention relates to a coated dry cell depolarizing core and more specifically to the method of forming the gelatinous electrolyte in a dry cell of the pasted type and is an improvement over the product and method disclosed in Schorger Patents Nos. 1,316,597 and 1,370,052.

The object of this invention is to provide an improved method of forming the gelatinous electrolyte in a dry cell of the pasted type and to provide a method for making a reserve type of cell.

In the accompanying drawings.

Figure 1:
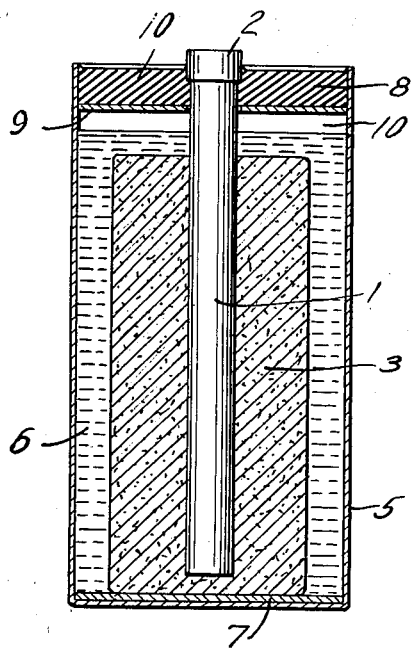
Fig. 1 is a vertical section view of a cell.
Figure 2:
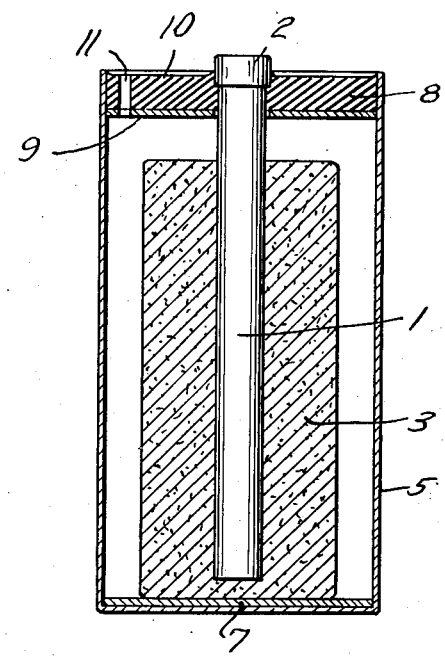
Fig. 2 is a similar view of a reserve cell prior to the addition of the electrolyte.

A dry cell of the pasted type usually has the construction shown in cross section in Fig. 1. A depolarizing core is made of a central carbon rod 1, with a metallic cap 2, around which is molded a moist depolarizing mixture 3 of powdered graphite, a depolarizer such as manganese dioxide, and conducting salts such as ammonium chloride and zinc chloride. The depolarizing core may be wrapped in a bibulous wrapper such as cheesecloth but in the cell of my invention this wrapping is unnecessary. The core is separated from the zinc can 5 by a pasty electrolyte 6 which consists of a mixture of a gelatinized cereal such as flour or starch, zinc and ammonium chlorides, and water. The bottom of the depolarizing core may be insulated from the can by means of insulating wax or by an insulating washer 7. The cell is completed by sealing material 8 resting on a spaced insulating washer 9 thereby providing expansion space 10.

This invention relates specifically to the method of producing the gelatinous electrolyte 6 whereby bibulous wrapper may be eliminated. Such a paste electrolyte is now formed in several different ways. The space between the core and can may be filled with a fluid suspension of cereal and water containing some of the electrolyte salts and the can then immersed in hot water to gelatinize the cereal.

In another method, as described in Hambuechen Patent No. 1,292,764 the cereal, such as corn starch, or a mixture of corn starch and corn meal, is stirred rapidly into a strong solution of ammonium chloride and zinc chloride, the percentage of the zinc chloride being high enough to gelatinize the cereal within a few minutes after mixing, thus allowing enough time to pour the suspension of cereal into the space between the core and zinc can before gelatinization occurs.

This method is modified in Schulte Patent 1,370,056 in which the cereal is suspended in a water solution of ammonium chloride and weak zinc chloride of such strength that it does not gelatinize the cereal. A second solution of strong zinc chloride and ammonium chloride is added to the starch suspension in such quantity as to give a final mixture of about the same composition as specified in Patent No. 1,292,764. The mixture is immediately introduced into the zinc cup containing the depolarizing core and the cereal gelatinizes within a few minutes as previously described. This method is more practical as two solutions are mixed which permits the use of simplified machinery for the operation.

If the gelatinizable electrolyte is introduced into the zinc cup by mechanical means as by the apparatus described in Hodge Patent No. 1,669,054, then it is best to compound the final electrolyte as it is introduced into the electrolyte hopper of that apparatus to keep it liquid as long as possible and thereby prevent gelatinization in the hopper before it is introduced into the zinc cup. However, if the apparatus is closed down for a few minutes gelatinization may take place and the electrolyte must be drained from the apparatus. With the present invention these difficulties are overcome as the gelatinizing cereal is in the form of a coating on the depolarizing core and the strong chloride gelatinizing solution free from cereal is the only solution used in the hopper. This solution, since cereal is not present, does not gelatinize and may be kept in the hopper indefinitely.

In carrying out my invention I use a liquid suspension of ungelatinized starch in a water solution of a colloid, such as gelatinized starch, such as is described and claimed in the copending application Serial No. 290,885 of my coworker, W. B. Schulte. The depolarizing core is dipped into this magma, allowed to set and then inserted into a zinc can containing an electrolyte containing zinc chloride. The zinc chloride slowly gelatinizes and swells the cereal coating so that the space between the core and the can is filled gradually with gelatinized cereal. The bibulous wrapping for the core may be omitted as the cereal magma forms a protective coating for the core. Since the starch gelatinization progresses from the outside of the coating to the core, this gradual gelatinization operates to assist in centering the core in the can.

In making the dip for the core I first make a suitable colloid suspending medium for the ungelatinized starch or cereal. I use in this specification the word "starch" as a generic term which includes all kinds of starches, meals, and flours which gelatinize in hot water or in the presence of strong zinc chloride but not in cold water. Without the presence of the colloid in the water the ungelatinized starch grains, which are to be suspended therein, settle rapidly to the bottom. Furthermore, a binder is lacking so that any coating formed with such starch dries to such a condition that it has little strength, and is not coherent.

A liquid colloid suspending medium may be made by making a dilute solution (being liquid at room temperatures) of glue or gelatinized starch in water, gelatinized starch being preferred. The amount of starch which is in gelatinized form may vary from 0.5% to 1.5% of the final complete suspension. The starch is gelatinized preferably by heating in water. After cooling, the ungelatinized raw starch is stirred into the colloid containing suspending medium so that the final suspension contains from 35% to 50% of starch. This suspension is mobile and "liquid" which distinguishes it from a "paste" which is not mobile.

The viscosity of the suspending medium may be cut down or the amount of starch which may be suspended may be increased by dissolving ammonium chloride in the suspending medium. Since ammonium chloride is needed in the gelatinous electrolyte of a dry cell the addition of the ammonium chloride to the starch suspension accomplishes a double purpose. From 5% to 15% of this salt preferably is present in the suspension.

The depolarizing core is dipped into this suspension and preferably is withdrawn slowly therefrom, the entire operation requiring from 5 to 15 seconds. The slow withdrawal results in a more even coating which does not have much tendency to form a bead at the bottom. The coating may vary from almost nothing up to about 1/8" in thickness depending upon the space available between the core and zinc can in the resulting dry cell. The consistency of the suspension may be varied according to the thickness required. The coating on the core sets rapidly as the moisture of the coating soaks into the depolarizing mix and it may be handled within a few minutes. It is almost completely dry within 24 hours in the open air under ordinary humidity conditions. The coating formed is hard, due to the presence of the colloid binder, and may be handled roughly without chipping or breaking off. It serves as a tight wrapper for the core.

The core is then introduced into the zinc can together with the gelatinizing electrolyte of strong zinc and ammonium chloride solution which fills the space between the starch coating and the zinc can. The starch slowly gelatinizes and swells as the zinc chloride solution soaks into it so that it gradually forms a solid paste 6 between the core 3 and can 5. This action is usually complete enough to allow handling of the cells within several hours. However, the action may be finished within a few minutes by immersing the cans in hot water. The core does not soften by this method as the moisture in the electrolyte does not come directly in contact with the core which is protected by the starch and colloid bound coating. The coating on the core also serves to keep the core centered in the can before introducing the gelatinizing electrolyte.

If the core is dipped in the starch suspension as described the bottom of the core is coated also with the mixture of starch and binder. It usually is desirable to have the bottom of the core insulated from the bottom of the can to prevent any possibility of short circuiting. This may be accomplished by inserting an insulating washer at the bottom of the can but I prefer to coat the bottom of the core, prior to coating with the starch, with an insulating material such as nitrocellulose, pitch, asphalt, or a wax such as beeswax, paraffin or sealing wax. When a wax is used to insulate the bottom of the core it has a further advantage in that the starch dip does not adhere to it. Therefore the bottom of the core is free of starch. If a small amount should adhere it is easily removed by setting the core on an absorbent pad.

When a core is dipped into the starch suspension the coating depends in some degree upon the rate at which the water is absorbed from the starch coating by the depolarizing mix. The density of the core and its moisture content determines its water absorbing capacity. Furthermore, if too much water is absorbed the core becomes soggy, thereby decreasing the efficiency of the cell. The water absorbing capacity of the cores has a direct effect on the thickness of the starch coating. This variation may be overcome by first coating the core with a thin colloid coating such as glue, agar-agar, boiled starch, and the like. A 4% agar-agar solution in water makes an excellent dip which is preferably used at a temperature of about 60° C. A thin film of agar-agar is formed on the core. The starch coating is put on over the agar-agar coating. A much more uniform starch coating is thus obtained which is not as heavy for the same starch suspension, as when the bare core is coated. The starch coating sets more slowly due to the slower absorption of moisture by the core. The bottom of the core preferably is coated with wax before the agar-agar coating is applied.

After the coating has dried it contains from 1% to 4% of gelatinized starch, and if ammonium chloride is used in the dip, from 10% to 40% of that salt.

As a specific embodiment of my invention the following illustration will serve to guide those skilled in the art. A starch suspension is made up which contains the following ingredients 44.2% water, 0.7% boiled starch, 11.7% ammonium chloride, and 43.4% raw commercial corn starch. The core bottom is coated with insulating wax after which it is dipped into and slowly withdrawn from the above suspension and set on any absorbent pad. After setting for several minutes it is introduced into a zinc can containing an electrolyte of the following composition: 38.7% $ZnCl_2$, 36.8% $H_2O$, 24.5% $NH_4Cl$. The cell is washed and pitched and allowed to stand for several hours after which it may be handled. Within several days the flash and voltage of the cell become normal indicating the completion of the diffusion of the electrolyte and gelatinization of the starch. The cell may be set in water at 75° C. for several minutes after pitching when it will be ready to put in service shortly thereafter.

This method of introducing the starch into and then gelatinizing it in a dry cell lends itself to the manufacture of a reserve or delayed action type of cell. The coated core is introduced into the can but without the liquid gelatinizing electrolyte. The cell is top sealed in the usual way but with or without provision for introducing the liquid electrolyte when it is desired to put the cell into action. This may be accomplished preferably by pouring the gelatinizing liquid into a hole 11 left in the seal 8 and washer 9, or if such hole has not been provided it may be easily made by means of a drill or a hot iron. The electrolyte is poured into the space between the core and can, the hole is resealed, and the cell is then allowed to remain quiet for several hours and it is ready for use. The cell can be put into immediate use by immersing it in hot water for several minutes. The can and core suffer no appreciable deterioration prior to the introduction of the electrolyte.

The starch coating described herein may also be used to coat other shapes of depolarizing cores than the cylindrical type which has been illustrated. It even may be used to coat flat depolarizing mix cakes or cores on those surfaces adjacent the zinc anode. The gelatinizing zinc chloride may be incorporated in the mix cake under those conditions. A small amount of zinc chloride insufficient to gelatinize the cereal, may also be incorporated in the liquid suspension.

I have also found that potato starch may be used to displace the ungelatinized corn starch of the liquid suspension partially or entirely. The potato starch gelatinizes rapidly as compared to corn starch in the presence of zinc chloride. This property of the potato starch results in the rapid gelatinization of the coating on the core when the cell is assembled as described, the gelatinization taking place in twenty to thirty minutes instead of several hours without immersing the cell in hot water. The advantage of the potato starch is apparent therefore to those skilled in the art.

Throughout this specification the sequence of operations whereby the liquid electrolyte is introduced into the can may be either of the following: either first putting the core into the can and then pouring in the electrolyte, or first pouring the electrolyte into the can and then inserting the core. I do not wish to limit this specification to either of these two methods.

The claims of the present application are directed to the product herein described. The process forms the subject matter of a divisional application Serial No. 377,474 filed July 11, 1929.

I claim:

1. A dry cell cathode core having a coating comprising ungelatinized starch and a binder of gelatinized starch.

2. A dry cell cathode core having a coating comprising ungelatinized potato starch and a binder of gelatinized starch.

3. A dry cell cathode core having a coating comprising ungelatinized starch having 1% to 4% of a binder of gelatinized starch.

4. A dry cell cathode core having a coating comprising an admixture of ungelatinized starch, ammonium chloride and a suitable colloid binder.

5. A dry cell cathode core having a coating comprising an admixture of ungelatinized starch, 10% to 40% of ammonium chloride and 1% to 4% of a binder of gelatinized starch.

6. A cylindrical dry cell cathode core having an insulated bottom and having a coating comprising ungelatinized starch and a binder of gelatinized starch.

7. A cylindrical dry cell cathode core having its bottom insulated with a waxy substance and having a coating comprising ungelatinized starch and a binder of gelatinized starch.

8. A cylindrical dry cell cathode core having an insulated bottom and having a coating comprising an admixture of ungelatinized starch, ammonium chloride, and binder of gelatinized starch.

9. A dry cell cathode core having a thin coating of a suitable colloid covered with a second coating comprising ungelatinized starch and a binder of gelatinized starch.

10. A dry cell cathode core having a thin coating of agar-agar covered with a second coating comprising ungelatinized starch and a binder of gelatinized starch.

11. A cylindrical dry cell cathode core having an insulated bottom and having a thin coating of a suitable colloid covered with a second coating comprising ungelatinized starch having a binder of gelatinized starch.

12. A cylindrical dry cell cathode core having an insulated bottom and having a thin coating of a suitable colloid covered with a second coating comprising ungelatinized potato starch and a binder of gelatinized starch.

13. A cylindrical dry cell cathode core having an insulated bottom and having a coating comprising ungelatinized potato starch and 1% to 4% of a binder of gelatinized starch.

In testimony whereof I affix my signature.

WAYNE D. STALEY.